United States Patent
Matsumoto et al.

(10) Patent No.: US 11,876,339 B2
(45) Date of Patent: Jan. 16, 2024

(54) OPTICAL AMPLIFIER, CONTROL METHOD FOR OPTICAL AMPLIFIER, AND OPTICAL COMMUNICATION SYSTEM

(71) Applicant: NEC Corporation, Tokyo (JP)

(72) Inventors: Keiichi Matsumoto, Tokyo (JP); Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 615 days.

(21) Appl. No.: 17/043,488

(22) PCT Filed: Mar. 30, 2018

(86) PCT No.: PCT/JP2018/013773
§ 371 (c)(1),
(2) Date: Sep. 29, 2020

(87) PCT Pub. No.: WO2019/187051
PCT Pub. Date: Oct. 3, 2019

(65) Prior Publication Data
US 2021/0057871 A1    Feb. 25, 2021

(51) Int. Cl.
*H01S 3/10* (2006.01)
*H01S 3/067* (2006.01)
(Continued)

(52) U.S. Cl.
CPC ........ *H01S 3/1001* (2019.08); *H01S 3/06737* (2013.01); *H01S 3/06754* (2013.01);
(Continued)

(58) Field of Classification Search
CPC .............. H01S 3/06737; H01S 3/1001; H01S 3/06754; H01S 3/094007; H01S 3/094011
See application file for complete search history.

(56) References Cited

U.S. PATENT DOCUMENTS

| 2010/0245988 A1* | 9/2010 | Takeyama ........... H01S 3/06758 359/341.5 |
| 2015/0168642 A1* | 6/2015 | Mimura ............ H01S 3/094007 385/33 |

(Continued)

FOREIGN PATENT DOCUMENTS

| JP | 09-116506 A | 5/1997 |
| JP | 11-112069 A | 4/1999 |

(Continued)

OTHER PUBLICATIONS

Makoto Yamada, et al., "Gain Control in Multi-Core Erbium/Ytterbium-Doped Fiber Amplifier with Hybrid Pumping", OECC/PS2016, Jul. 2016, 3 pages.

(Continued)

*Primary Examiner* — Eric L Bolda
(74) *Attorney, Agent, or Firm* — Sughrue Mion, PLLC

(57) ABSTRACT

A pumping light source outputs pumping lights. A pumping light source outputs a pumping light. Optical multiplexers couple the pumping lights to a plurality of cores. The optical multiplexer couples the pumping light to the clad. A pumping light source drive unit drives a pumping light source. A pumping light source drive unit drives a pumping light source. A monitoring unit outputs a monitoring signal indicating a monitoring result of the number of wavelengths used in each of optical signals amplified by the plurality of the cores. The control unit controls the power of the pumping lights based on the monitoring signal. The control unit controls the power of each of the pumping lights in accordance with the number of wavelengths used in each of the optical signals and controls the power of the pumping light so that signal qualities of the optical signals fall within a prescribed range.

9 Claims, 10 Drawing Sheets

(51) Int. Cl.
*H01S 3/094* (2006.01)
*H04B 10/2581* (2013.01)
*H04B 10/61* (2013.01)
*H04B 10/50* (2013.01)
*H04B 1/10* (2006.01)

(52) U.S. Cl.
CPC .. *H01S 3/094007* (2013.01); *H01S 3/094049* (2013.01); *H01S 3/10015* (2013.01); *H04B 10/2581* (2013.01); *H04B 10/50* (2013.01); *H04B 10/61* (2013.01); *H01S 2301/02* (2013.01)

(56) References Cited

U.S. PATENT DOCUMENTS

| | | | |
|---|---|---|---|
| 2015/0263477 A1* | 9/2015 | Onaka | G02F 1/1337 372/6 |
| 2020/0412079 A1* | 12/2020 | Matsumoto | H01S 3/13013 |
| 2021/0359485 A1* | 11/2021 | Nakamura | H01S 3/06754 |

FOREIGN PATENT DOCUMENTS

| | | |
|---|---|---|
| JP | 11-112434 A | 4/1999 |
| JP | 2005-5744 A | 1/2005 |
| JP | 2013-231838 A | 11/2013 |
| JP | 2016-167489 A | 9/2016 |
| JP | 2017-21070 A | 1/2017 |
| WO | 2017/183061 A1 | 10/2017 |

OTHER PUBLICATIONS

Emmanuel Le Taillandier De Gabory et al., "Transmission of 256Gb/s PM-16QAM Signal through Hybrid Cladding and Core Pumping Scheme MC-EDFA Controlled for Reduced Power Consumption", OFC 2017, Mar. 2017, 3 pages.

Yukihiro Tsuchida et al., "Simultaneous 7-Core Pumped Amplification in Multicore EDF through Fibre Based Fan-In/Out", ECOC Technical Digest, Sep. 2012, 3 pages.

International Search Report for PCT/JP2018/013773 dated Jun. 12, 2018 (PCT/ISA/210).

Extended European Search Report for EP Application No. EP18911433.3 dated Mar. 26, 2021.

Takayuki Mizuno et al., "Hybrid Cladding-pumped EDFA/Raman for SDM Transmission Systems Using Core-by-core Gain Control Scheme", 2017 European Conference on Optical Communication (ECOC), IEEE, Sep. 17, 2017.

* cited by examiner

OPTICAL AMPLIFIER, CONTROL METHOD FOR OPTICAL AMPLIFIER, AND OPTICAL COMMUNICATION SYSTEM

CROSS REFERENCE TO RELATED APPLICATIONS

This application is a National Stage of International Application No. PCT/JP2018/013773 filed Mar. 30, 2018.

TECHNICAL FIELD

The present disclosure relates to an optical amplifier, a control method for the optical amplifier, and an optical communication system.

BACKGROUND ART

As an optical communication system, one that is configured to amplify an optical signal with an optical amplifier that employs an optical fiber doped with a rare-earth element such as erbium in order to compensate for the attenuation of the optical signal caused by the long-distance transmission has been known. Since this kind of amplifier is high in efficiency as well as in gain, and the gain is substantially polarization-independent, it is employed as an amplifier for relaying an optical signal in an optical communication system (Patent Literatures 1 to 4).

In the optical communication system, progress is being made to develop a multiplexing technology in order to increase the communication capacity. For example, a multi-core optical fiber amplifier in which a plurality of cores are arranged within one clad is known. As the multi-core optical fiber amplifier, a configuration in which core-individual-pumping is performed by causing a pumping light to propagate through each of the cores to amplify a signal light is known (Patent Literature 5).

In performing the core-individual-pumping, generally, the semiconductor laser diodes are disposed in the number same as the number of the cores in order to couple the pumping light into each core. Therefore, the consumption power of the semiconductor laser diodes increases in proportion to the number of the cores. On the other hand, a configuration in which a pumping light from a single high-output semiconductor laser diode is coupled into a clad to pump the plurality of cores in a simultaneous manner using the pumping light made incident from the clad to the cores to thereby perform clad-simultaneous-pumping is known (Patent Literature 6 and Non-Patent Literature 1). By using the clad-simultaneous-pumping, the power that is consumed in the core-individual-pumping is reduced whereby the power consumption in the whole optical amplifier can be reduced.

CITATION LIST

Patent Literature

Patent Literature 1: Japanese Unexamined Patent Application Publication No. H9-116506
Patent Literature 2: Japanese Unexamined Patent Application Publication No. H11-112434
Patent Literature 3: Japanese Unexamined Patent Application Publication No. 2005-5744
Patent Literature 4: Japanese Unexamined Patent Application Publication No. 11-112069
Patent Literature 5: Japanese Unexamined Patent Application Publication No. 2017-21070
Patent Literature 6: Japanese Unexamined Patent Application Publication No. 2016-167489

Non Patent Literature

Non-Patent Literature 1: "Transmission of 256 Gb/s PM 16QAM Signal through Hybrid Cladding and Core Pumping Scheme MC-EDFA Controlled for Reduced Power Consumption", Paper Th1C.1, OFC, 2017

SUMMARY OF INVENTION

Technical Problem

However, depending on the pumping light wavelength or the propagation direction of the pumping light (a so-called forward pumping or backward pumping), the quality of the signal light is deteriorated when the clad-simultaneous-pumping is used excessively. Therefore, the amplification factor of the optical amplifier cannot be increased, thereby causing the distance between the optical amplifiers to be short. As a result, the number of the optical amplifiers disposed in the optical communication system increases, whereby the consumption power of the whole optical communication system increases.

The present disclosure has been made in view of the circumstances mentioned above. An object of the present disclosure is to provide an optical amplifier that can amplify an optical signal while ensuring desired quality thereof and reduce power consumption by using both the core-individual-pumping and the clad-simultaneous-pumping, a control method for the optical amplifier, and an optical communication system.

Solution to Problem

An optical amplifier according to an aspect includes:
a multi-core optical fiber amplifier configured to encompass a plurality of cores in a clad;
a first pumping light source configured to output a plurality of first pumping lights for pumping the plurality of cores;
a second pumping light source configured to output a second pumping light for pumping the clad;
a first multiplexer configured to couple the first pumping light to the plurality of cores;
a second multiplexer configured to couple the second pumping light to the clad;
a first pumping light source drive unit configured to drive the first pumping light source;
a second pumping light source drive unit configured to drive the second pumping light source;
a monitoring unit configured to output a first monitoring signal indicating a monitoring result of the number of wavelengths used in each of the plurality of optical signals amplified by the plurality of cores of the multi-core optical fiber amplifier; and
a control unit configured to control power of the plurality of the first pumping lights by controlling the first pumping light source drive unit based on the first monitoring signal and to control power of the second pumping light by controlling the second pumping light drive source unit, in which the control unit is configured to control the power of each of the plurality of the first pumping lights in accordance with the number of the wavelengths used in each of the plurality of the optical signals, and control the power of the second pumping light so that signal qualities of the plurality of the optical signals fall within a prescribed range.

A control method for an optical amplifier according to another aspect includes:

monitoring the number of optical signals used in each of a plurality of optical signals that are amplified by a plurality of cores of a multi-core optical fiber amplifier and outputting a first monitoring signal indicating a monitoring result;

controlling power of each of the plurality of the first pumping lights for pumping the plurality of the cores in accordance with the number of the wavelengths used in each of the plurality of the optical signals based on the first monitoring signal; and controlling power of a second pumping light coupled to a clad that encompasses the plurality of the cores so that the signal qualities of the plurality of the optical signals fall within a prescribed range.

An optical communication system according to another aspect includes:

a transmitter configured to output a plurality of optical signals; and an optical amplifier configured to amplify the plurality of the optical signals output form the transmitter, in which the optical amplifier includes:

a multi-core optical fiber amplifier configured to encompass a plurality of cores in a clad;

a first pumping light source configured to output a plurality of first pumping lights for pumping the plurality of cores;

a second pumping light source configured to output a second pumping light for pumping the clad;

a first multiplexer configured to couple the first pumping light to the plurality of cores;

a second multiplexer configured to couple the second pumping light to the clad;

a first pumping light source drive unit configured to drive the first pumping light source;

a second pumping light source drive unit configured to drive the second pumping light source;

a monitoring unit configured to output a first monitoring signal indicating a monitoring result of the number of wavelengths used in each of the plurality of optical signals amplified by the plurality of the cores of the multi-core optical fiber amplifier; and a control unit configured to control power of the plurality of the first pumping lights by controlling the first pumping light drive unit based on the first monitoring signal and to control power of the second pumping light by controlling the second pumping light drive unit, in which the control unit is configured to control power of each of the plurality of the first pumping lights in accordance with the number of the wavelengths used in each of the plurality of the optical signals, and control power of the second pumping light so that signal qualities of the plurality of the optical signals fall within a prescribed range.

Advantageous Effects of Invention

According to the present disclosure, an optical amplifier that can amplify an optical signal while ensuring desired quality thereof and reduce power consumption by using both the core-individual-pumping and the clad-simultaneous-pumping, a control method for the optical amplifier, and an optical communication system can be provided.

DESCRIPTION OF EMBODIMENTS

Figure 1:
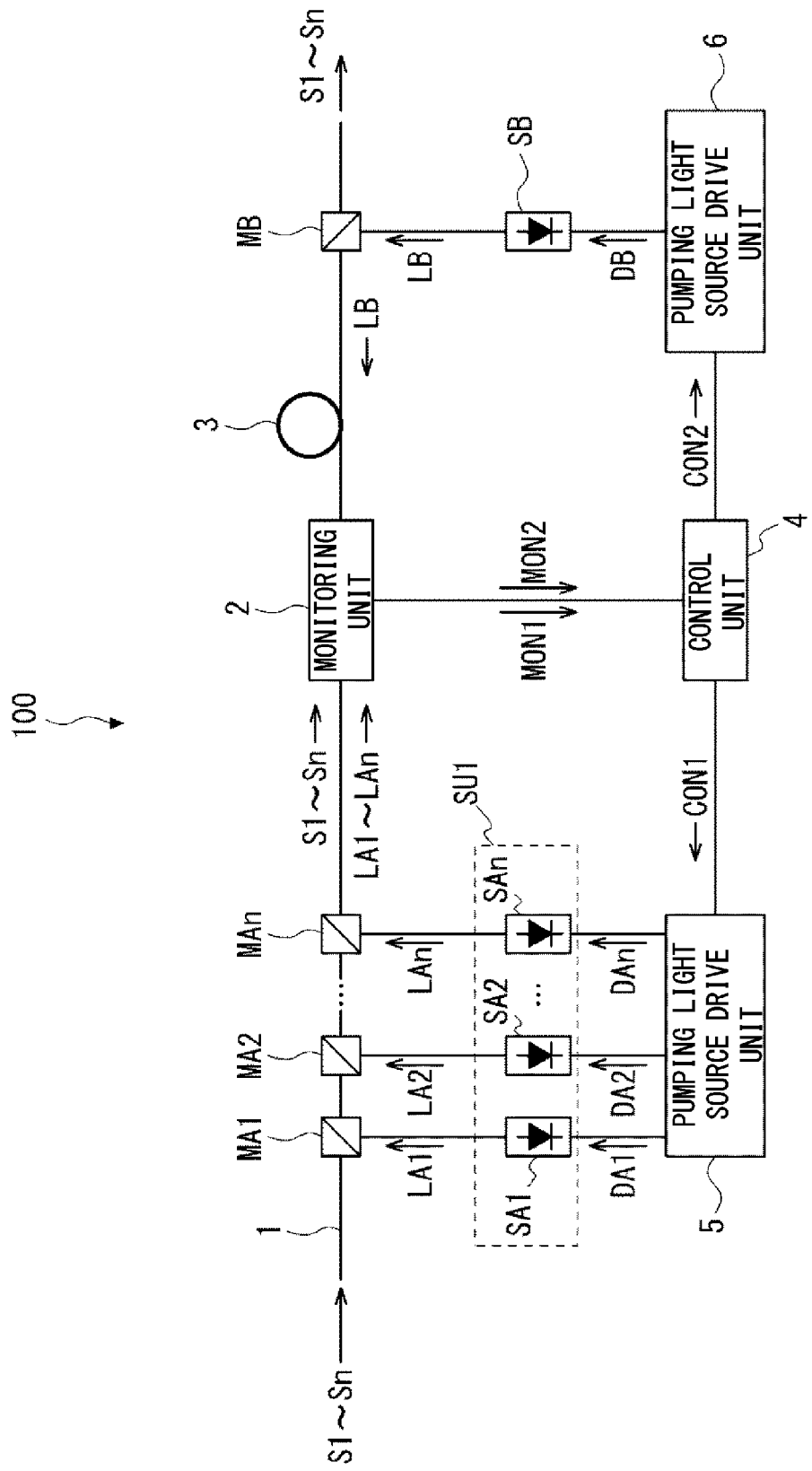
FIG. 1 is a diagram schematically showing a configuration of an optical amplifier according to a first example embodiment.

Hereinafter, the present disclosure will be described with reference to the embodiments of the present disclosure. The same symbols are assigned to the same elements in the drawings and duplicated explanations thereof are omitted where appropriate.

First Example Embodiment

An optical amplifier 100 according to a first example embodiment will be described. FIG. 1 schematically shows a configuration of the optical amplifier 100 according to the first example embodiment. The optical amplifier 100 includes a multi-core optical fiber 1, a monitoring unit 2, an EDF 3, a control unit 4, a pumping light source drive unit 5, a pumping light source drive unit 6, light emitting devices SA1 to SAn, a pumping light source SB, optical multiplexers MA1 to MAn, and an optical multiplexer MB.

The light emitting devices SA1 to SAn output pumping lights LA1 to LAn (n is an integer equal to or larger than 2) to the optical multiplexers MA1 to MAn (also referred to as first optical multiplexers), respectively, that are inserted into the multi-core optical fiber 1. Each of the pumping lights LA1 to LAn is also referred to as a first pumping light. The optical multiplexers MA1 to MAn couple the pumping lights LA1 to LAn into n number of cores, respectively, that are provided to the multi-core optical fiber 1. The pumping lights LA1 to LAn coupled into the n number of cores propagate through the EDF 3 via the monitoring unit 2 to pump the cores of the EDF 3. The light emitting devices SA1 to SAn configure a pumping light source SU1 that outputs the pumping lights LA1 to LAn used in the core-individual-pumping. The pumping light source SU1 is also referred to as a first pumping light source.

In this example, the pumping lights LA1 to LAn propagate through the EDF 3 in the direction same as the propagation direction of the optical signals S1 to Sn. The configuration in which the propagation directions of the pumping light and the optical signal are the same is referred to as the forward pumping.

The pumping light source SB outputs the pumping light LB to the optical multiplexer MB (also referred to as a second optical multiplexer) inserted into the multi-core optical fiber 1. The pumping light source SB is also referred to as a second pumping light source. The optical multiplexer MB couples the pumping light LB into the clad that encompasses the n number of cores provided to the multi-core optical fiber 1. The pumping light LB is also referred to as a second pumping light. The pumping light LB coupled into the clad propagates through the EDF 3 and pumps the cores of the EDF 3.

In this example, the pumping light LB propagates through the EDF 3 in the direction opposite to the propagation direction of the optical signals S1 to Sn. The configuration in which the propagation directions of the pumping light and the optical signal are opposite to each other is referred to as the backward pumping.

The monitoring unit 2 monitors the light that propagates through the n number of cores of the multi-core optical fiber 1 and outputs the monitoring result to the control unit 4.

Figure 2:
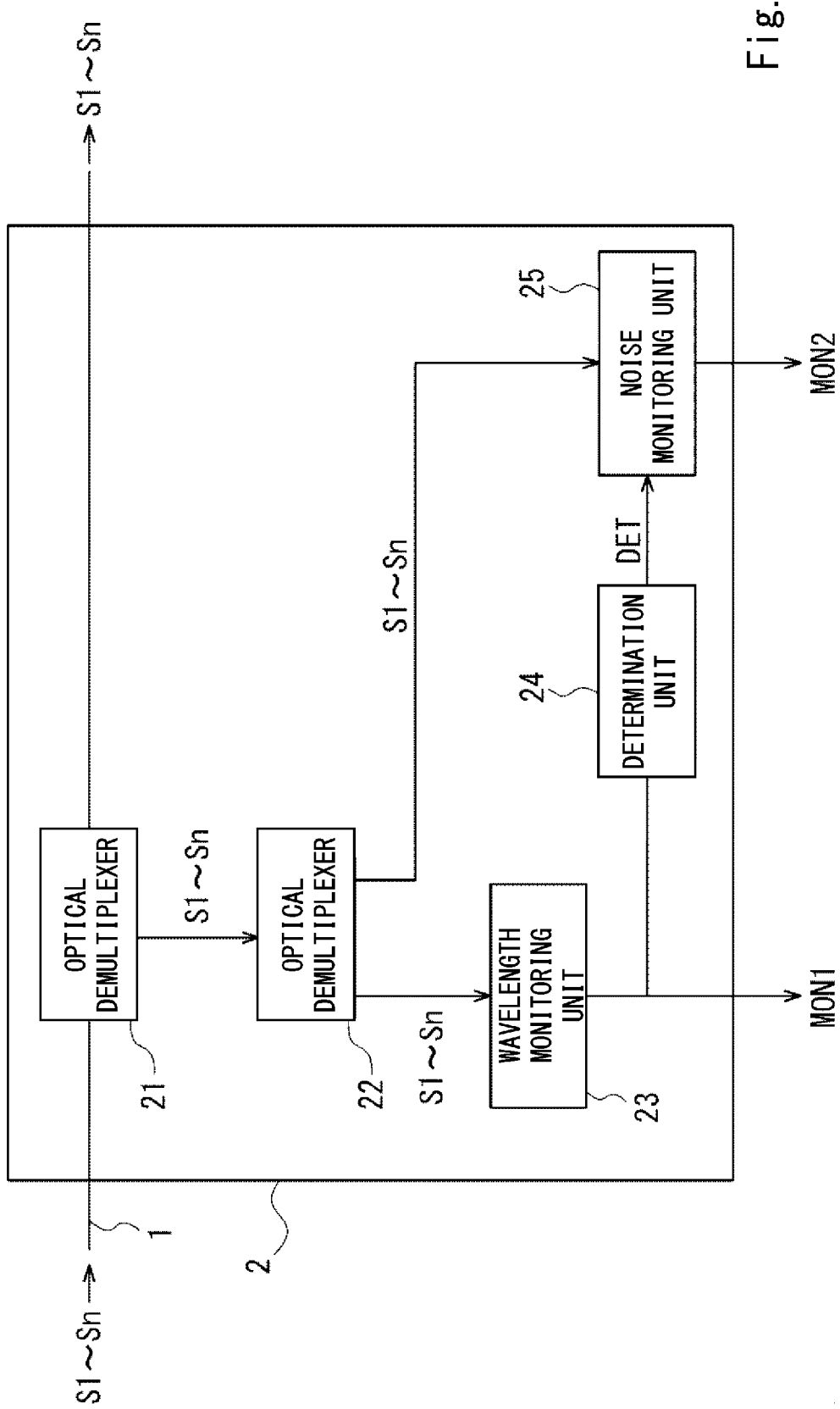
FIG. 2 is a diagram schematically showing a configuration of a monitoring unit according to the first example embodiment.

FIG. 2 schematically shows a configuration of the monitoring unit 2 according to the first example embodiment. The monitoring unit 2 includes an optical demultiplexer 21, an optical demultiplexer 22, a wavelength monitoring unit 23, a determination unit 24, and a noise monitoring unit 25.

The optical demultiplexer 21 branches a part of the light that propagates through the multi-core optical fiber 1 and outputs the branched light to the optical demultiplexer 22. Here, the power of the branched light is smaller than the power of the light propagated through the multi-core optical fiber 1. Therefore, there is substantially no influence of the decrease in the power of the light that propagates through the multi-core optical fiber 1.

The optical demultiplexer 22 branches the light output from the optical demultiplexer 21 to the wavelength monitoring unit 23 and the noise monitoring unit 25.

The wavelength monitoring unit 23 monitors the number of the wavelengths used in transmitting the optical signals, that is, the number of the wavelengths that are multiplexed, for each of the optical signals S1 to Sn that are included in the light output from the optical demultiplexer 22, and outputs a monitoring signal MON1 (also referred to as a first monitoring light) indicating the monitoring result to the determination unit 24 and the control unit 4.

The determination unit 24 determines the optical signal having the least number of multiplexed wavelengths from among the optical signals S1 to Sn based on the monitoring signal MON1. The determination unit 24 outputs a determination signal DET indicating the determination result to the noise monitoring unit 25.

The noise monitoring unit 25 monitors the noise of the optical signal having the least number of multiplexed wavelengths based on the determination signal DET. The noise monitoring unit 25 compares the noise factor with a threshold value TH (also referred to as a first value) and outputs a monitoring signal MON2 (also referred to as a second monitoring light) indicating the comparison result to the control unit 4. The threshold value TH may, for example, be pre-stored in an unillustrated storage unit.

The control unit 4 outputs a control signal CON1 for instructing control of the light emitting devices SA1 to SAn to the pumping light source drive unit 5 (also referred to as a first pumping light source drive unit) based on the monitoring signal MON1. The pumping light source drive unit 5 controls the power of the pumping lights LA1 to LAn output from the light emitting devices SA1 to SAn by outputting the drive signals DA1 to DAn to the light emitting devices SA1 to SAn in accordance with the control signal CON1.

Further, the control unit 4 outputs a control signal CON2 for instructing control of the pumping light source SB to the pumping light source drive unit 6 (also referred to as a second pumping light source drive unit) based on the monitoring signal MON2. The pumping light source drive unit 6 controls the power of the pumping light LB output from the pumping light source SB by outputting the drive signal DB to the pumping light source SB in accordance with the control signal CON2.

Figure 3:
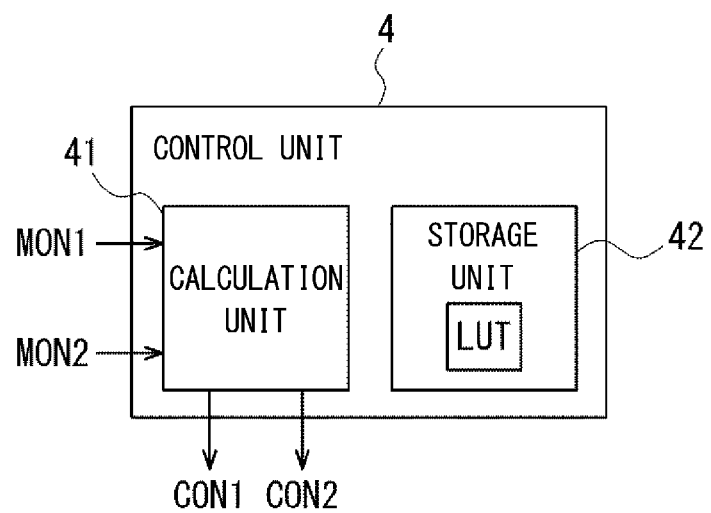
FIG. 3 is a diagram schematically showing a configuration of a control unit according to the first example embodiment.

FIG. 3 schematically shows the control unit 4 according to the first example embodiment. The control unit 4 includes a calculation unit 41 and a storage unit 42. The calculation unit 41 refers to a lookup table LUT stored in the storage unit 42 based on the monitoring signal MON1 and controls the pumping light source drive unit 5 by the control signal CON1 so that the optical power of each of the optical signals S1 to Sn becomes an appropriate value corresponding to the number of the multiplexed wavelengths.

The calculation unit 41 refers to the monitoring signal MON2 and when the noise factor is larger than the threshold value TH, it increases the optical power of the pumping lights LA1 to LAn by providing a command to the pumping light source drive unit 5 through the control signal CON1. Further, the calculation unit 41 decreases the optical power of the pumping light LB by providing a command to the pumping light source drive unit 6 through the control signal CON2.

That is, in the present configuration, it is possible to perform clad-simultaneous-pumping using the pumping light LB while performing core-individual-pumping using the pumping lights LA1 to LAn in a state in which the optical power of each of the pumping lights LA1 to LAn is maintained at a suitable value corresponding to the number of the multiplexed wavelengths.

Further, the monitoring unit 2 monitors the noise of the optical signal having the least number of multiplexed wavelengths. When the noise exceeds a prescribed level, the pumping light source is controlled so that the power of each of the pumping lights LA1 to LAn input to the cores increases and the power of the pumping light LB input to the clad decreases. As a result, the rate of the clad-simultaneous-pumping which is the cause of the noise decreases, and thus the noise factor of the optical signal having the least number of the multiplexed wavelengths can be decreased.

When the noise factor decreases and becomes smaller than the prescribed value, the control unit 4 may control the pumping light source so as to fix the power of the pumping lights LA1 to LAn and the pumping light LB at a value in which the noise factor has decreased to a value lower than the prescribed value.

The noise factor of the optical signal deteriorates in proportion to the reciprocal of the number of the multiplexed wavelengths. Therefore, it can be understood that when the clad-simultaneous-pumping is performed in the multi-core optical fiber optical amplifier, the smaller the number of the multiplexed wavelengths, the more the noise factor of the optical signal deteriorates.

In the present configuration, the rate of the clad-simultaneous-pumping is maximized by adjusting the optical power of the pumping lights LA1 to LAn that are used in the core-individual-pumping and the optical power of the pumping light LB that is used in the clad-simultaneous-pumping so that the noise factor of the optical signal having the least number of the multiplexed wavelengths among the optical signals S1 to Sn falls within a desired range. As a result, the noise factors of the optical signals other than the optical signal having the least number of the multiplexed wavelengths among the optical signals S1 to Sn can be made to fall within the desired range.

Figure 4:
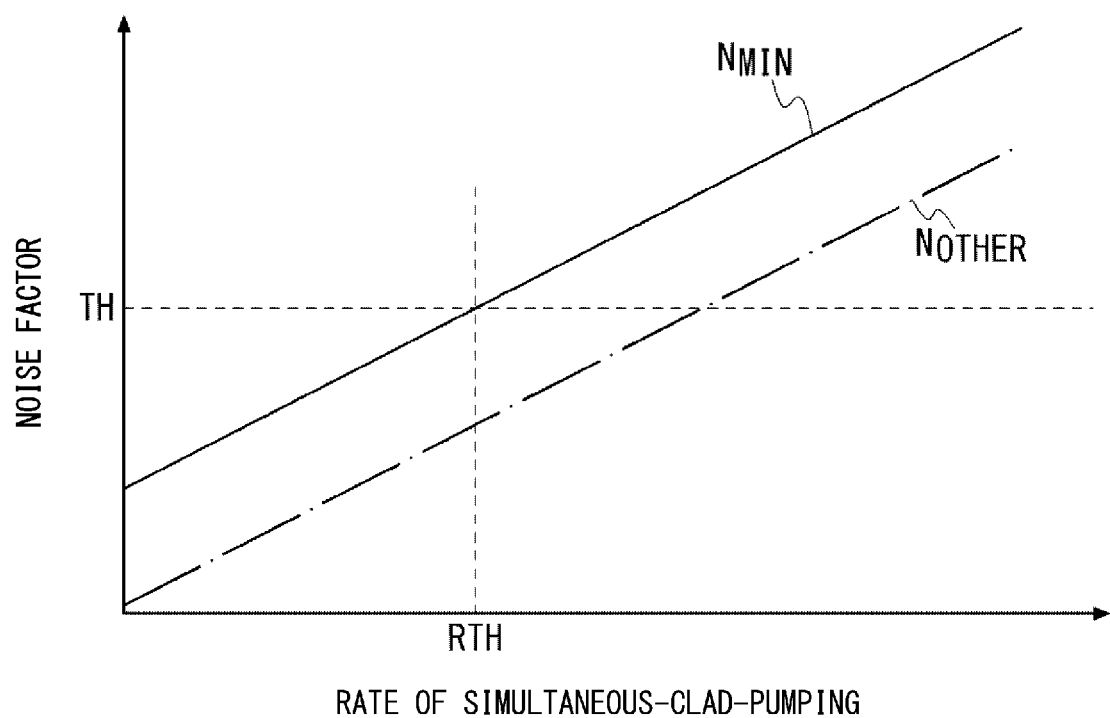
FIG. 4 is a diagram showing a relationship between the rate of clad-pumping and a noise factor.

FIG. 4 shows a relationship between the rate of the clad-simultaneous-pumping and the noise factor. A noise factor $N_{MIN}$ of the optical signal having the least number of the multiplexed wavelengths among the optical signals S1 to Sn increases as the rate of the clad-simultaneous-pumping increases. However, according to the present configuration, the noise factor $N_{MIN}$ of the optical signal having the least number of the multiplexed wavelengths among the optical signals S1 to Sn can be made to fall within the permissible range that is smaller than the threshold value TH. Note that in FIG. 4, the rate of the clad-simultaneous-pumping corresponding to the threshold value TH is indicated as RTH.

Further, in FIG. 4, a noise factor $N_{OTHER}$ of the optical signal other than the optical signal having the least number of the multiplexed wavelengths among the optical signals S1 to Sn is indicated. It can be understood that the noise factor $N_{OTHER}$ is always smaller than the noise factor $N_{MIN}$ regardless of the rate of the clad-simultaneous-pumping.

As described above, according to the present configuration, the rate of the clad-simultaneous-pumping can be maximized while bringing the signal quality of the optical signal that propagates through each of the multi-core optical fibers to fall within a desired range, whereby the power consumption in the whole optical amplifier can be reduced.

Figure 5:
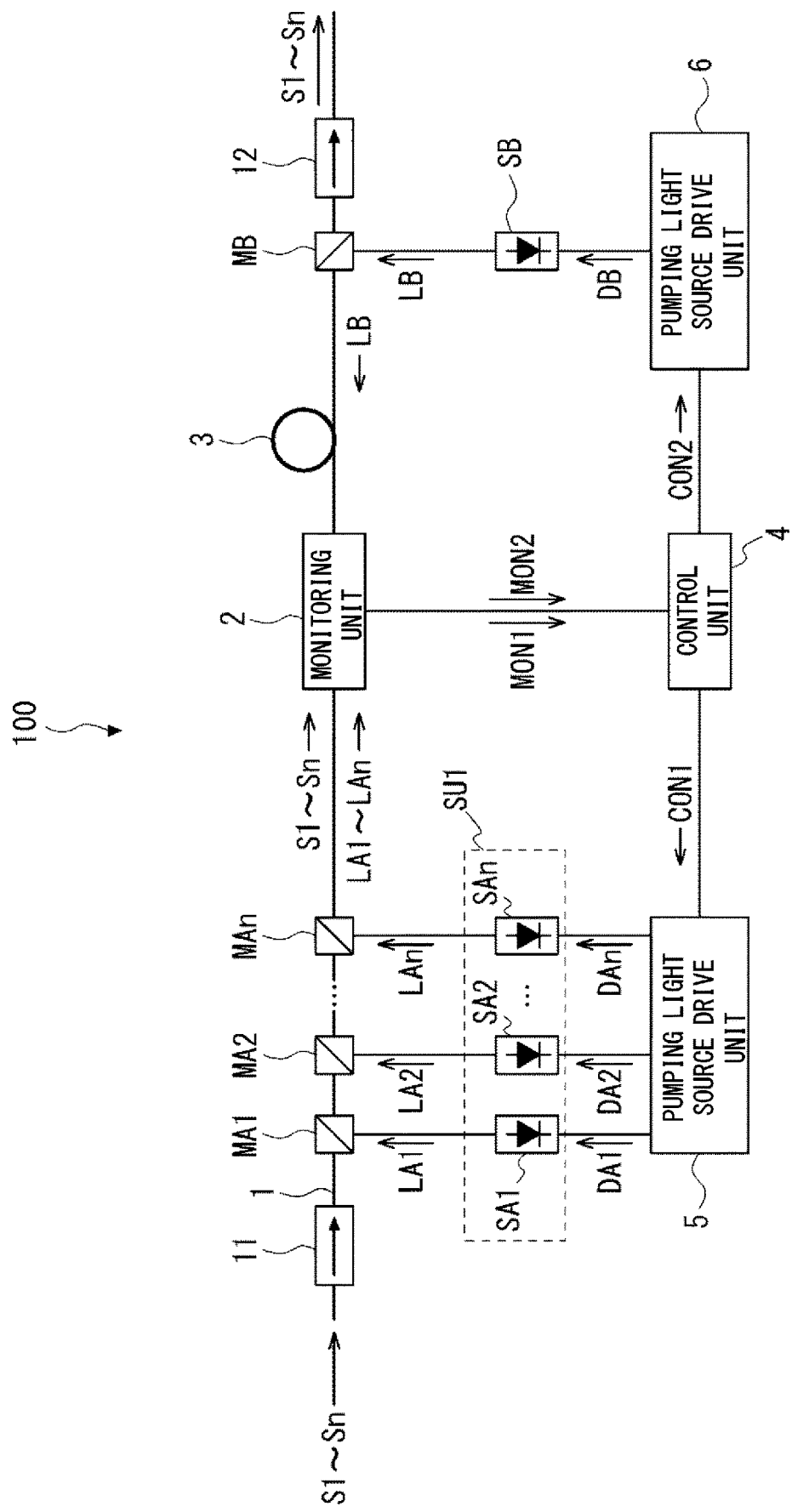
FIG. 5 is a diagram schematically showing an example in which an optical isolator is provided to the optical amplifier according to the first example embodiment.

Note that an optical amplifier that uses the optical fiber doped with a rare-earth element such EDF3 has reversibility in the amplification direction of the optical signal. Therefore, in order to prevent oscillation of the optical amplifier due to the multiple reflection of the optical signal, an optical isolator may be disposed between an input terminal and an output terminal for the optical signal. FIG. 5 schematically shows an example in which an optical isolator is provided to the optical amplifier 100 according to the first example embodiment. In FIG. 5, an optical isolator 11 is provided to the input terminal for the optical signals S1 to Sn and an optical isolator 12 is provided to the output terminal for the optical signals S1 to Sn. With this configuration, oscillation of the optical amplifier 100 due to the multiple reflection of the optical signals S1 to Sn can be prevented.

Note that in the present example embodiment, the noise factor was monitored in order to maintain the quality of the optical signal, however, this is merely an example. That is, the signal characteristics other than the noise factor may be monitored. For example, the level of the amplified spontaneous emission (ASE) included in each of the optical signals S1 to Sn may be used in place of the noise factor. Further, an ASE light may be monitored and the level of the ASE light may be converted to a noise factor in the control unit.

Second Example Embodiment

Figure 6:
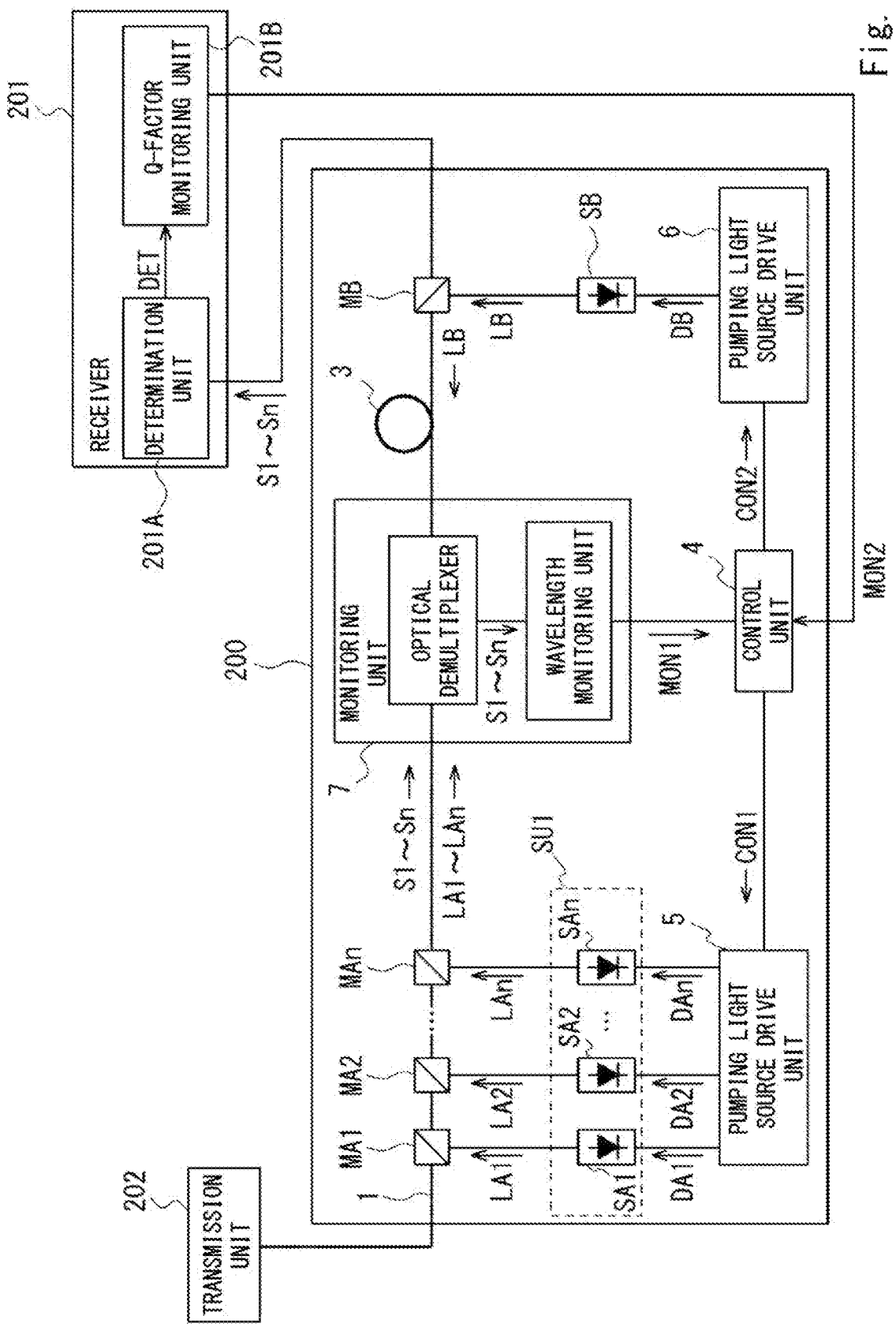
FIG. 6 is a diagram schematically showing a configuration of an optical amplifier according to a second example embodiment.

An optical amplifier 200 according to a second example embodiment will be described. FIG. 6 schematically shows a configuration of the optical amplifier 200 according to the second example embodiment. The optical amplifier 200 has a configuration in which the monitoring unit 2 of the optical amplifier 100 according to the first example embodiment is replaced with a monitoring unit 7.

The monitoring unit 7 has a configuration in which the optical demultiplexer 22, the determination unit 24, and the noise monitoring unit 25 are removed from the monitoring unit 2.

In this example, the monitoring signal MON2 is received from the receiver 201 that receives the optical signals S1 to Sn that are amplified by the optical amplifier 100 and then output.

The receiver 201 includes a determination unit 201A and a Q-factor monitoring unit 201B.

The determination unit 201A detects a signal having the least signal quality from among the received optical signals S1 to Sn. The determination unit 201A outputs the determination signal DET indicating the detection result to the Q-factor monitoring unit 201B.

The Q-factor monitoring unit 201B monitors the Q-factor of the optical signal having the lowest signal quality based on the determination signal DET. The Q-factor monitoring unit 201B compares the quality level of the selected optical signal with the prescribed quality level and outputs the monitoring signal MON2 indicating the comparison result to the control unit 4.

As described above, according to the present configuration, the receiver that has received the optical signal from the optical amplifier monitors the quality of the optical signal and notifies the optical amplifier of the monitoring result. Accordingly, the rate of the core-individual-pumping and the rate of the clad-simultaneous-pumping are adjusted and it becomes possible to bring the quality level of the optical signal to fall within a desired range.

Note that in the present example embodiment, the Q-factor has been monitored in order to maintain the quality of the optical signal, however, this is merely an example. That is, the signal characteristics other than the Q-factor may be monitored. For example, the noise factor, the code error rate, or the level of the amplified spontaneous emission (ASE) included in each of the optical signals S1 to Sn may be used in place of the Q-factor. Further, the level of the ASE may be converted to a noise factor in the control unit by monitoring the ASE.

Figure 7:
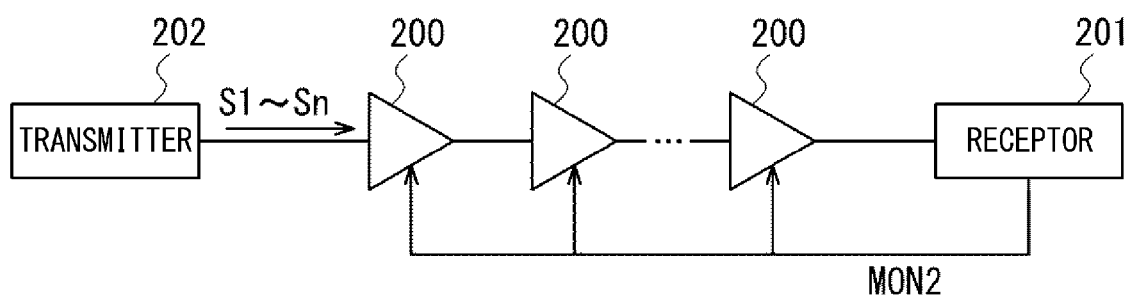
FIG. 7 is a diagram schematically showing a configuration of an optical communication system to which a plurality of optical amplifiers are cascade-connected.

Further, in the present example embodiment, even when a plurality of the optical amplifiers are cascade-connected, each of the optical amplifiers can be controlled effectively. FIG. 7 is a diagram schematically showing a configuration of an optical communication system in which a plurality of the optical amplifiers are cascade-connected.

The transmitter 202 outputs the optical signals S1 to Sn to the receiver 201 via the plurality of optical amplifiers 200. The receiver 201 outputs the monitoring signal MON2 indicating the monitoring result of the optical signals S1 to Sn as described above to each optical amplifier 200. Each optical amplifier 200 can adjust the ratio of the core-individual-pumping to the clad-simultaneous-pumping in accordance with the monitoring signal MON2.

Various methods can be employed for the method for outputting the monitoring signal MON2 to the optical amplifier 200 by the receiver 201. The receiver 201 may output the monitoring signal MON2 to the optical amplifier 200 using an exclusive communication line. The exclusive communication line may be a wired communication line or a wireless communication line. Further, the monitoring signal MON2 may be an electric signal or an optical signal.

When the monitoring signal MON2 is an optical signal, the monitoring signal MON2 may be transmitted to the optical amplifier 200 via the optical fiber used for transmission of the main signal for data transmission. The optical amplifier 200 may convert the received monitoring signal MON2 from an optical signal to an electric signal using an unillustrated device such as a photodiode.

Further, the receiver 201 may output the monitoring signal MON2 to the optical amplifier 200 via the communication network which is not an exclusive communication network. As the communication network, a network used for controlling the optical communication system in which the optical amplifier 200 is incorporated or other general-purpose network can be used.

Third Example Embodiment

Figure 8:
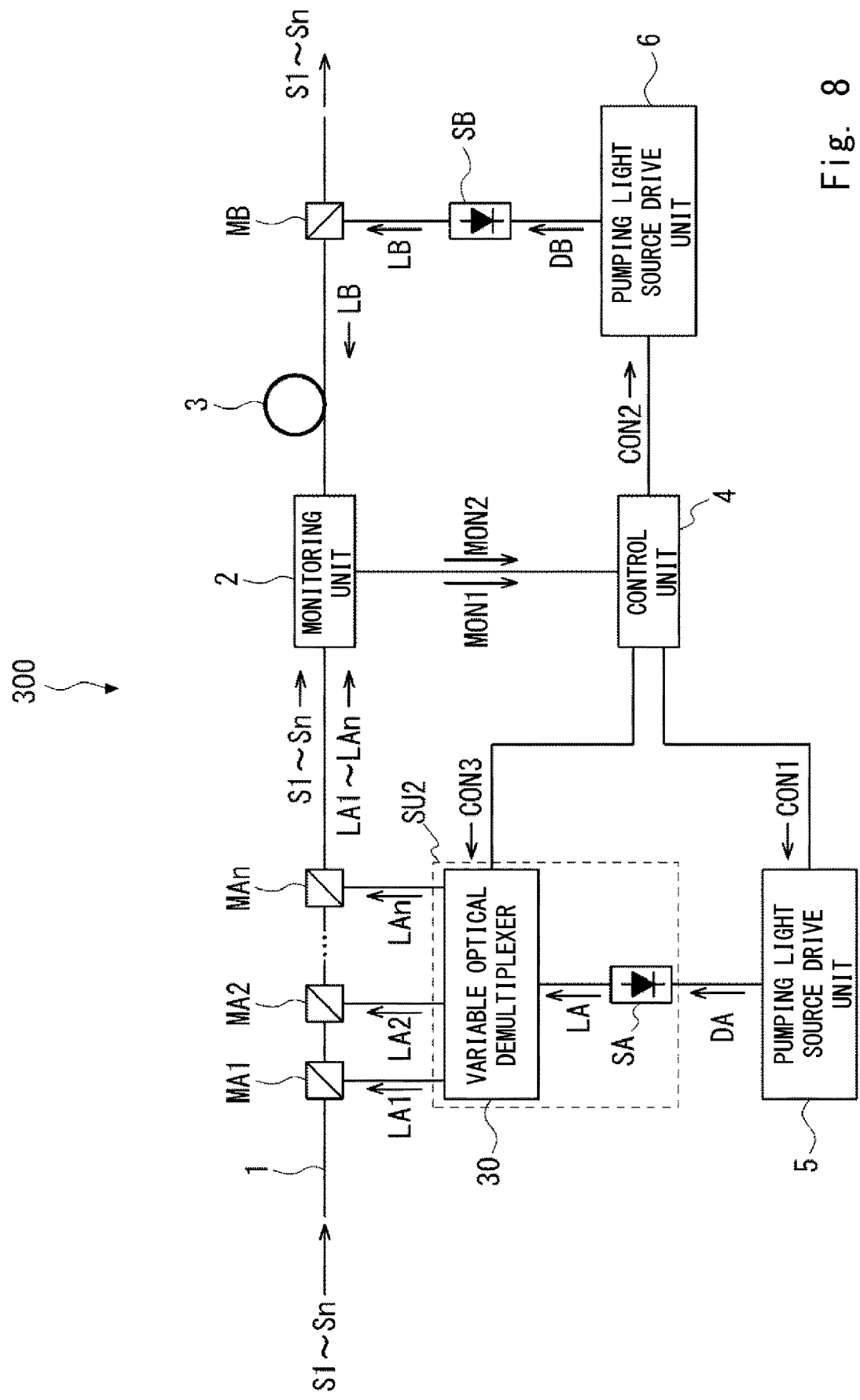
FIG. 8 is diagram schematically showing a configuration of an optical amplifier according to a third example embodiment.

An optical amplifier 300 according to a third example embodiment will be described. FIG. 8 schematically shows a configuration of the optical amplifier 300 according to the third example embodiment. The optical amplifier 300 has a configuration in which the light emitting devices SA1 to SAn of the optical amplifier 100 according to the first example embodiment are replaced with a light emitting device SA and a variable optical demultiplexer 30 is added.

The pumping light source drive unit 5 controls the power of the light LA output from the light emitting device SA in accordance with the control signal CON1. The variable optical demultiplexer 30 branches the light LA output from the light emitting device SA to n number of pumping lights LA1 to LAn and distributes the branched lights to the optical demultiplexers MA1 to MAn, respectively. The light emitting device SA and the variable demultiplexer 30 configure the pumping light source SU2 that outputs the pumping lights LA1 to LAn used in the core-individual-pumping. The pumping light source SU2 is also referred to as a first pumping light source.

The control unit 4 outputs a control signal CON3 to the variable optical multiplexer 30 to control the power of the pumping lights LA1 to LAn.

Other configurations and operations of the optical amplifier 300 are the same as those of the optical amplifier 100 according to the first example embodiment and thus detailed descriptions thereof are omitted.

According to the present configuration, it is possible to bring the quality level of the optical signal to fall within a desired range by adjusting the rate of the core-individual-pumping and the rate of the clad-simultaneous-pumping in the same manner as in the first example embodiment.

Further, according to the present configuration, the number of the pumping light source used in the core-individual-pumping can be reduced whereby cost reduction of the optical amplifier can be realized. Furthermore, it is possible to reduce the power consumption in a cooling unit such as a Peltier cooler provided for cooling the pumping light source. As a result, it is possible to reduce the power consumption in the optical amplifier.

Fourth Example Embodiment

Figure 9:
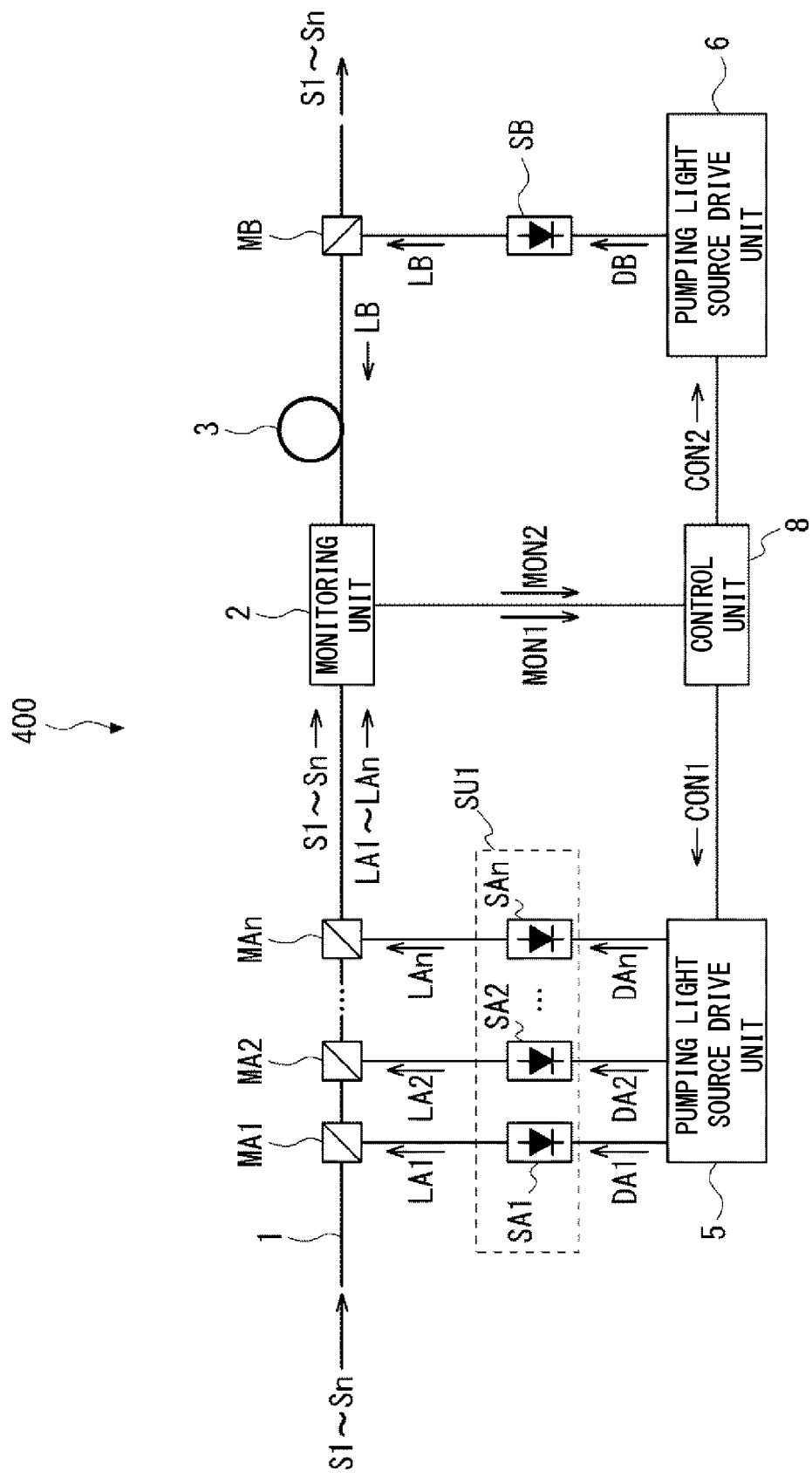
FIG. 9 is a diagram schematically showing a configuration of an optical amplifier according to a fourth example embodiment.

An optical amplifier 400 according to a fourth example embodiment will be described. FIG. 9 schematically shows a configuration of the optical amplifier 400 according to the fourth example embodiment. The optical amplifier 400 has a configuration in which the control unit 4 of the optical amplifier 100 according to the first example embodiment is replaced with a control unit 8.

The control unit 8 receives the monitoring signal MON1 and outputs the control signal CON1 for instructing control of the light emitting devices SA1 to SAn to the pumping light source drive unit 5 in the same manner as the control unit 4. The pumping light source drive unit 5 controls the power of the pumping lights LA1 to LAn output from the light emitting devices SA1 to SAn by outputting the drive signals DA1 to DAn to the light emitting devices SA1 to SAn in accordance with the control signal CON1.

Furthermore, the control unit 8 compares the number of the multiplexed wavelengths of each of the optical signals S1 to Sn with the threshold value TH2 based on the monitoring signal MON1. When the number of the multiplexed wavelengths of each of the optical signals S1 to Sn is larger than the threshold value TH2, the control unit 8 instructs the pumping light source drive unit 6 to stop performing the optical output of the pumping light source SB through the control signal CON2. Thus, the pumping light source drive unit 6 stops the pumping light source SB from performing the optical output.

In the present example embodiment, the number of the wavelengths for which the power consumption in the optical amplifier can be reduced when only the core-individual-pumping is used compared to the case where both the core-individual-pumping and the clad-simultaneous-pumping are used is set to be the threshold value TH2. That is, when the number of the multiplexed wavelengths of each of the optical signals S1 to Sn is larger than the threshold value TH2, the pumping light source SB is stopped to thereby perform only the core-individual-pumping. Accordingly, the power consumption in the whole optical amplifier can be reduced When the number of the multiplexed wavelengths of each of the optical signals S1 to Sn is smaller than the threshold value TH2, it is possible to minimize the power consumption amount while amplifying the optical signals by using both the core-individual-pumping and the clad-simultaneous-pumping.

Fifth Example Embodiment

Figure 10:
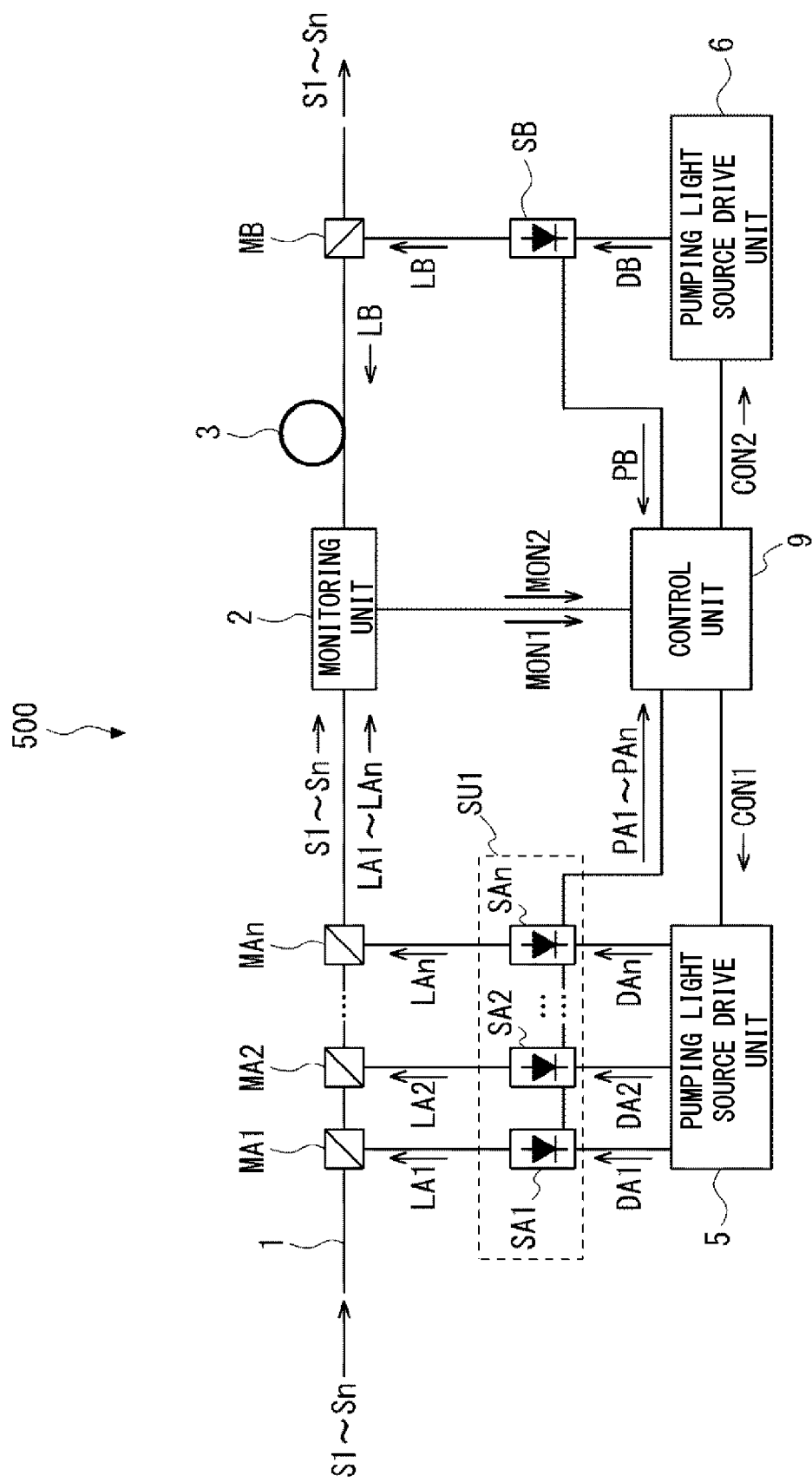
FIG. 10 is a diagram schematically showing a configuration of an optical amplifier according to a fifth example embodiment.

An optical amplifier 500 according to a fifth example embodiment will be described. FIG. 10 schematically shows a configuration of the optical amplifier 500 according to the fifth example embodiment. The optical amplifier 500 has a configuration in which the control unit 4 of the optical amplifier 100 according to the first example embodiment is replaced with a control unit 9.

The control unit 9 receives the monitoring signal MON1 and outputs the control signal CON1 for instructing control of the light emitting devices SA1 to SAn to the pumping light source drive unit 5 in the same manner as the control unit 4. The pumping light source drive unit 5 controls the power of the pumping lights LA1 to LAn output from the light emitting devices SA1 to SAn by outputting the drive signals DA1 to DAn to the light emitting devices SA1 to SAn in accordance with the control signal CON1.

Further, the control unit 9 receives notification signals PA1 to PAn indicating the power of the pumping lights LA1 to LAn from the light emitting devices SA1 to SAn and receives a notification signal PB indicating the power of the pumping light LB from the pumping light source SB.

The control unit 9 compares the power of the pumping lights LA1 to LAn with a threshold value TH3 based on the notification signals PA1 to PAn. When the power of the pumping lights LA1 to LAn is larger than the threshold value TH3, the control unit 9 instructs the pumping light source drive unit 5 to stop performing the optical output of the light emitting devices SA1 to SAn through the control signal CON1. Accordingly, the pumping light source drive unit 5 stops the light emitting devices SA1 to SAn from performing the optical output.

The control unit 9 compares the power of the pumping light LB with a threshold value TH4 based on the notification signal PB. When the power of the pumping light LB is larger than the threshold value TH4, the control unit 9 instructs the pumping light source drive unit 6 to stop performing the optical output of the pumping light source SB through the control signal CON2. Accordingly, the pumping light source drive unit 6 stops the pumping light source SB from performing the optical output.

As described above, according to the present configuration, rise in the power consumption can be suppressed by stopping the pumping light source before the power thereof becomes excessive.

Other Example Embodiments

Note that the present disclosure is not limited to the above-described example embodiments, and various modifications can be made without departing from the spirit and scope of the present disclosure. For example, the core-individual-pumping was performed by the forward pumping and the clad-simultaneous-pumping was performed by the backward pumping, however, this is merely an example and the configuration of the EDF3 is not limited thereto. The core-individual-pumping may be performed by the backward pumping and the clad-simultaneous-pumping may be performed by the forward pumping. The core-individual-pumping and the clad-simultaneous-pumping may both be performed by the forward pumping or by the backward pumping.

Further, the EDF3 may be replaced with a different optical fiber amplifier doped with a different rare-metal element other than an erbium-doped optical fiber amplifier. Further, the number of the fiber optical amplifier in the optical amplifier according to the above-described example embodiments may not be limited to one, and two or more fiber optical amplifiers may be provided.

The optical amplifiers according to the above-described first to third example embodiments are effective when the optical signal that propagates through the plurality of cores uses a relatively small number of wavelengths. In such case, since the rate of the clad-simultaneous-pumping becomes relatively high, the power consumption can be reduced effectively by adjusting the output of the pumping light used in the clad-simultaneous-pumping. On the other hand, the optical amplifiers according to the fourth and the fifth example embodiments are effective in the case where the number of the wavelengths of the optical signal propagated to the plurality of cores is relatively large. In this case, since the power of the pumping light used in the core-individual-pumping is relatively large, it is possible to effectively reduce the power consumption by controlling the light source for the core-individual-pumping.

It is needless to mention that as for the optical amplifiers according to the third to the fifth example embodiments too, it is possible to employ the configuration in which the monitoring unit 2 is replaced with the monitoring unit 7 and the monitoring signal MON2 is received from the receiver 201 likewise the optical amplifier according to the second example embodiment.

It is needless to mention that as for the optical amplifiers according to the second, the fourth, and the fifth example embodiments too, it is possible to employ the configuration in which the pumping light source SU2 is replaced with the pumping light source SU1 likewise the optical amplifier according to the second example embodiment.

The control of the pumping light source according to the example embodiments 4 and 5 can be combined as appropriate.

In the above-described example embodiments, the present disclosure has been described in terms of a hardware configuration, however, the present disclosure is not limited thereto. The present disclosure is implemented by causing the calculation unit of the central processing unit (CPU) execute a computer program to perform the operations of the control unit.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

REFERENCE SIGNS LIST

1 Multicore Optical Fiber
2, 7 Monitoring Unit
3 EDF
4 Control Unit
5, 6 Pumping Light Source Drive Unit
8, 9 Control Unit
11, 12 Optical Isolator
21, 22 Optical Demultiplexer
23 Wavelength Monitoring Unit
24 Determination Unit
25 Noise Monitoring Unit
30 Variable Optical Demultiplexer
41 Calculation Unit
42 Storage Unit
100, 200, 300, 400, 500 Optical Amplifiers
201 Receiver
201a Determination Unit
201b Q-Factor Monitoring Unit
202 Transmitter
SA, SA1 to SAn Light Emitting Device
SB, SU1, SU2 Pumping Light Source
MA1 to MAn, MB Optical Multiplexer
CON1 to CON3 Control Signal

The invention claimed is:

1. An optical amplifier comprising:
a multi-core optical fiber amplifier configured to encompass a plurality of cores in a clad;
a first pumping light source configured to output a plurality of first pumping lights for pumping the plurality of cores;
a second pumping light source configured to output a second pumping light for pumping the clad;
a first multiplexer configured to couple the first pumping light to the plurality of cores;
a second multiplexer configured to couple the second pumping light to the clad;
a first pumping light source drive unit configured to drive the first pumping light source;
a second pumping light source drive unit configured to drive the second pumping light source;
a monitoring unit configured to output a first monitoring signal indicating a monitoring result of the number of wavelengths used in each of the plurality of optical signals amplified by the plurality of cores of the multi-core optical fiber amplifier; and
a control unit configured to control power of the plurality of the first pumping lights by controlling the first pumping light source drive unit based on the first monitoring signal and to control power of the second pumping light by controlling the second pumping light drive source unit,
wherein the control unit is configured to
control the power of each of the plurality of the first pumping lights in accordance with the number of the wavelengths used in each of the plurality of the optical signals, and
control the power of the second pumping light so that signal qualities of the plurality of the optical signals fall within a prescribed range,
the monitoring unit is configured to further output a second monitoring signal indicating whether the signal qualities of the plurality of the optical signals fall within a desired range,
the control unit is configured to control power of the second pumping light based on the second monitoring signal,
the monitoring unit comprises:
a wavelength monitoring unit configured to monitor the number of wavelengths used in each of the plurality of optical signals amplified by the plurality of cores of the multi-core optical fiber amplifier and to output the first monitoring signal;
a determination unit configured to determine an optical signal that uses the least number of the wavelengths from among the plurality of the optical signals by referring to the first monitoring signal; and
a characteristic monitoring unit configured to compare a prescribed signal characteristic of the optical signal that uses the least number of the wavelengths with a first value and to output the second monitoring signal indicating a comparison result.

2. The optical amplifier according to claim 1, wherein
the prescribed signal characteristic is either a noise factor of the optical signal that uses the least number of the wavelengths or the noise factor converted from a level of an amplified spontaneous emission included in the optical signal that uses the least number of the wavelengths and a level of the amplified spontaneous emission, and the control unit is configured to reduce the power of the second pumping light when the prescribed signal characteristic is larger than the first value.

3. The optical amplifier according to claim 2, wherein the control unit is configured to increase the power of the plurality of the first pumping lights when the prescribed characteristic is larger than the first value.

4. The optical amplifier according to claim 1, wherein the first pumping light source comprises a plurality of light emitting devices configured to output the plurality of the first pumping lights.

5. The optical amplifier according to claim 1, wherein
the first pumping light source comprises:
a light emitting device configured to emit light; and
a variable optical demultiplexer configured to demultiplex the light output from the light emitting device into the plurality of the first pumping lights, and
the control unit is configured to control power of each of the plurality of the first pumping lights by controlling the variable optical demultiplexer.

6. The optical amplifier according to claim 1, wherein the control unit is configured to stop the second pumping light from outputting the second pumping light in accordance with the number of the wavelengths used in each of the plurality of the optical signals.

7. The optical amplifier according to claim 1, wherein
the first pumping light source is configured to notify the control unit of the power of the plurality of the first pumping lights,
the second pumping light source is configured to notify the control unit of the power of the second pumping light, and
the control unit is configured to stop the first pumping light source from outputting the plurality of the first pumping lights when power of any one of the plurality of the first pumping lights is larger than a second value, and to stop the second pumping light source from outputting the second pumping light when power of the second pumping light is larger than a third threshold value.

8. A control method for an optical amplifier comprising:
monitoring the number of optical signals used in each of a plurality of optical signals that are amplified by a plurality of cores of a multi-core optical fiber amplifier and outputting a first monitoring signal indicating a monitoring result;
controlling power of each of the plurality of the first pumping lights for pumping the plurality of the cores in accordance with the number of the wavelengths used in each of the plurality of optical signals based on the first monitoring signal;
determining an optical signal that uses the least number of the wavelengths from among the plurality of the optical signals by referring to the first monitoring signal;
comparing a prescribed signal characteristic of the optical signal that uses the least number of the wavelengths with a first value;
further outputting a second monitoring signal indicating a comparison result; and
controlling power of a second pumping light coupled to a clad that encompasses the plurality of the cores so that the signal qualities of the plurality of the optical signals fall within a prescribed range based on the second monitoring signal.

9. An optical communication system comprising:
a transmitter configured to output a plurality of optical signals; and an optical amplifier configured to amplify the plurality of the optical signals output form the transmitter, wherein the optical amplifier comprises:

a multi-core optical fiber amplifier configured to encompass a plurality of cores in a clad;

a first pumping light source configured to output a plurality of first pumping lights for pumping the plurality of cores;

a second pumping light source configured to output a second pumping light for pumping the clad;

a first multiplexer configured to couple the first pumping light to the plurality of cores;

a second multiplexer configured to couple the second pumping light to the clad;

a first pumping light source drive unit configured to drive the first pumping light source;

a second pumping light source drive unit configured to drive the second pumping light source;

a monitoring unit configured to output a first monitoring signal indicating a monitoring result of the number of wavelengths used in each of the plurality of optical signals amplified by the plurality of the cores of the multi-core optical fiber amplifier, and a control unit configured to control power of the plurality of the first pumping lights by controlling the first pumping light drive unit based on the first monitoring signal and to control power of the second pumping light by controlling the second pumping light drive unit, wherein the control unit is configured to control power of each of the plurality of the first pumping lights in accordance with the number of the wavelengths used in each of the plurality of the optical signals, and control power of the second pumping light so that signal qualities of the plurality of the optical signals fall within a prescribed range, the monitoring unit is configured to further output a second monitoring signal indicating whether the signal qualities of the plurality of the optical signals fall within a desired range, the control unit is configured to control power of the second pumping light based on the second monitoring signal, the monitoring unit comprises:

a wavelength monitoring unit configured to monitor the number of wavelengths used in each of the plurality of optical signals amplified by the plurality of cores of the multi-core optical fiber amplifier and to output the first monitoring signal;

a determination unit configured to determine an optical signal that uses the least number of the wavelengths from among the plurality of the optical signals by referring to the first monitoring signal; and a characteristic monitoring unit configured to compare a prescribed signal characteristic of the optical signal that uses the least number of the wavelengths with a first value and to output the second monitoring signal indicating a comparison result.

* * * * *